US005327328A

United States Patent [19]
Simms et al.

[11] Patent Number: 5,327,328
[45] Date of Patent: Jul. 5, 1994

[54] LIGHTPIPE AND LIGHTPIPE ARRAY FOR REDIRECTING LIGHT FROM A SURFACE MOUNT LED

[75] Inventors: Norman Simms, Barnegat; Michael Cazzola, Toms River, both of N.J.

[73] Assignee: Dialight Corporation, Manasquan, N.J.

[21] Appl. No.: 68,856

[22] Filed: May 28, 1993

[51] Int. Cl.$^5$ ............................................. G01D 11/28
[52] U.S. Cl. ....................................... 362/26; 362/31; 362/32; 362/800
[58] Field of Search ............... 362/32, 31, 26, 27, 362/30, 23, 28, 29, 800; 40/546

[56] References Cited

U.S. PATENT DOCUMENTS

| | | | |
|---|---|---|---|
| 4,163,883 | 8/1979 | Boulanger | 362/32 |
| 4,321,655 | 3/1982 | Bouvrande | 362/31 |
| 4,800,466 | 1/1989 | Bauer et al. | 362/32 |
| 4,935,856 | 6/1990 | Dragoon | 362/800 |
| 5,063,479 | 11/1991 | Satoh | 362/32 |
| 5,130,761 | 7/1992 | Tanaka | 362/800 |

Primary Examiner—James C. Yeung
Attorney, Agent, or Firm—Oblon, Spivak, McClelland, Maier & Neustadt

[57] ABSTRACT

A lightpipe or lightpipe array is utilized for redirecting light from a surface mounted LED. The lightpipe includes a first surface portion which is aligned with a surface mounted LED on a circuit board when the lightpipe is mounted on the circuit board, a first passageway comprising a plurality of first reflecting surfaces for redirecting light received at the first surface portion in a first direction, a second passageway extending from the first passageway comprising a plurality of second reflecting surfaces for redirecting the light received from the first passageway in a second direction which is different from the first direction, and a light radiating surface portion through which the light received from the second passageway exits so as to provide a visual indicator. Utilization of a plurality of lightpipes in a lightpipe array permits the array in the form of a single molded part to collect light from multiple LEDs and to redirect light to different locations without a perceptible mixture of light between adjacent LEDs.

8 Claims, 3 Drawing Sheets

LIGHTPIPE AND LIGHTPIPE ARRAY FOR REDIRECTING LIGHT FROM A SURFACE MOUNT LED

BACKGROUND OF THE INVENTION

1. Field of the Invention

The present invention relates to structures for mounting visual indicators over a connector such as a standard RJ 45 connector, which is a known telephone jack, in either a single or arrayed position. The visual indicators are utilized to, for example, show the status (e.g. idle or busy) of telephone lines. The present invention further relates to the utilization of an optical wave guide which can be mounted over a set of surface mounted LEDs positioned behind a connector such as a standard RJ 45 connector and redirecting the light to a position just above the input side of the above-noted connector.

More specifically, the present invention relates to a lightpipe for redirecting light from a surface mounted LED, as well as a lightpipe array comprised of a plurality of adjacently disposed lightpipes for redirecting light from a plurality of surface mounted LEDs.

2. Description of the Related Art

Right angle circuit board indicators in a variety of sizes have been known since about 1970. To handle needs for increased packaging density, and to simplify assembly labor, through-hole circuit board indicators designed and built into arrays have been used. The transition from through-hole soldering processes to surface mounted processes has created the need for surface mount compatible circuit board indicators that are also right angle devices.

The approaches utilized for increasing packaging densities for through-hole indicators are not satisfactory for surface mounted applications. A surface mounted LED should ideally be visible and accessible around the solder connections so that solder joint integrity is viewable and rework is possible. Also, a limitation exists in package height because common component placement equipment in use can only clear components at relatively low heights from printed circuit board surfaces. Further, stability of taller surface mounted devices is a problem. Moreover, the weight of an array may be greater than component placement equipment can readily accommodate.

OBJECTS OF THE INVENTION

Accordingly, an object of the present invention is to provide for a novel lightpipe to be used with surface mounted LEDs. The surface mounted LEDs may be placed and soldered using surface mounting equipment.

A further object of the present invention is to provide for a molded plastic lightpipe which may be attached to either a circuit board or a panel and which is utilized to redirect the LED illumination to a different location. The design of the light pipe of the present invention permits the use of lens materials that need not be subjected to the temperature extremes and chemicals encountered during surface mount soldering processes. Accordingly, the light pipe of the present invention can be utilized to, for example, redirect light from a set of SMD LEDs which are soldered behind a set of RJ 45 connector jacks to positions just above the jack output. This design provides a technician or operator with an easy and reliable status of the particular jack position.

A further object of the present invention is to provide for a light pipe array formed of a plurality of adjacently disposed lightpipes. The adjacently disposed lightpipes can be formed of a single molded part and can collect light from multiple LEDs and redirect the light to corresponding multiple locations without any perceptible cross talk, mixture, or light bleed between the LEDs.

SUMMARY OF THE INVENTION

The present invention accordingly provides for a lightpipe for redirecting light from a surface mounted LED which comprises a first surface portion which is aligned with a surface mounted LED on a circuit board when the light pipe is mounted on the circuit board; a first passageway comprising a plurality of first reflecting surfaces for redirecting light received at the first surface portion from the surface mounted LED in a first direction; a second passageway extending from the first passageway, the second passageway comprising a plurality of second reflecting surfaces for redirecting the light received from the first passageway in a second direction which is different from the first direction; and a light radiating surface portion through which the light received from the second passageway exits so as to provide a visual indicator.

The present invention also provides for a lightpipe array for redirecting light from a plurality of surface mounted LEDs which comprises a first pair of adjacently positioned light pipes connected to each other by a first connecting portion; a second pair of adjacently positioned light pipes connected to each other by a second connecting portion; and a third connecting portion for connecting the first pair of adjacently positioned lightpipes to the second pair of adjacently positioned lightpipes.

The lightpipe array as set forth above is capable of collecting light from multiple LEDS and redirecting the light to different locations without a perceptible mixture of light between the individual adjacently positioned lightpipes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
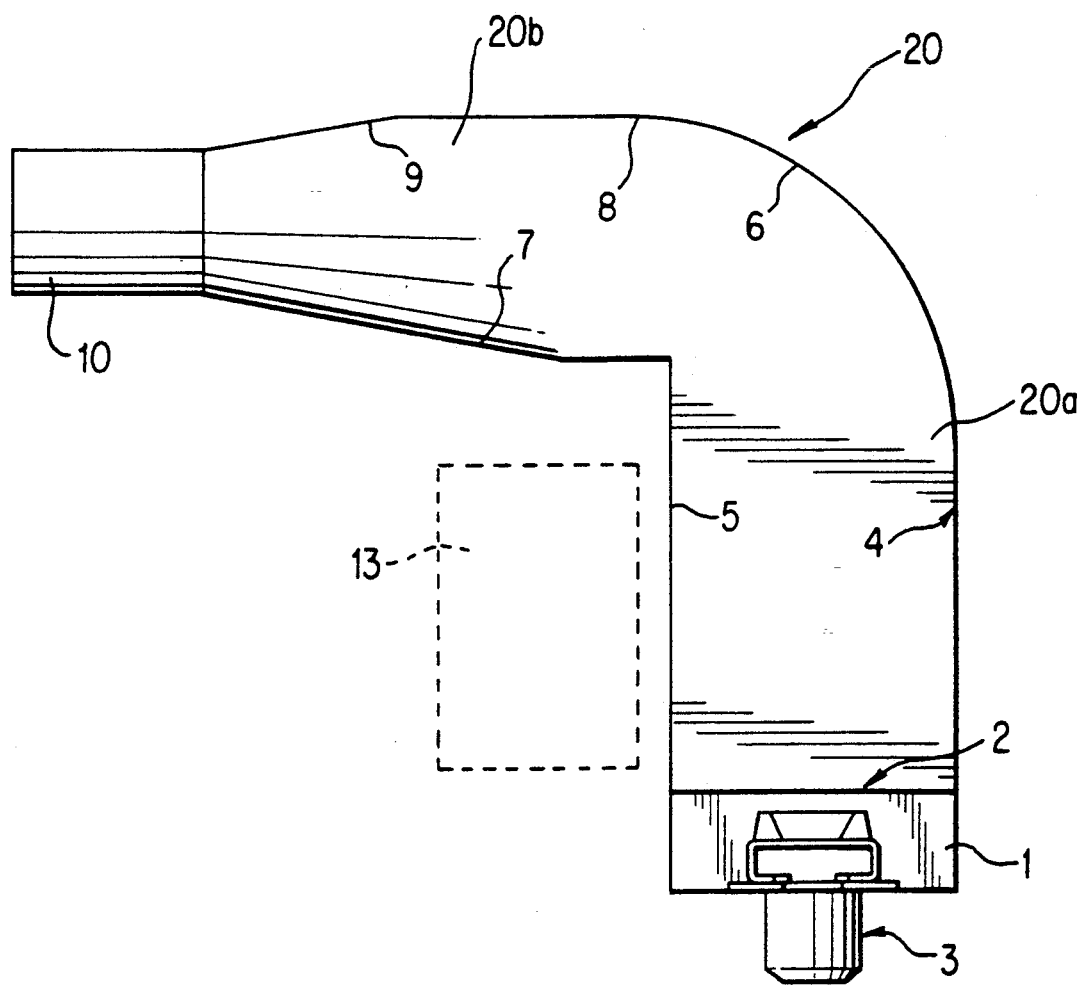
FIG. 1 illustrates a side view of the lightpipe of the present invention.
Figure 3:
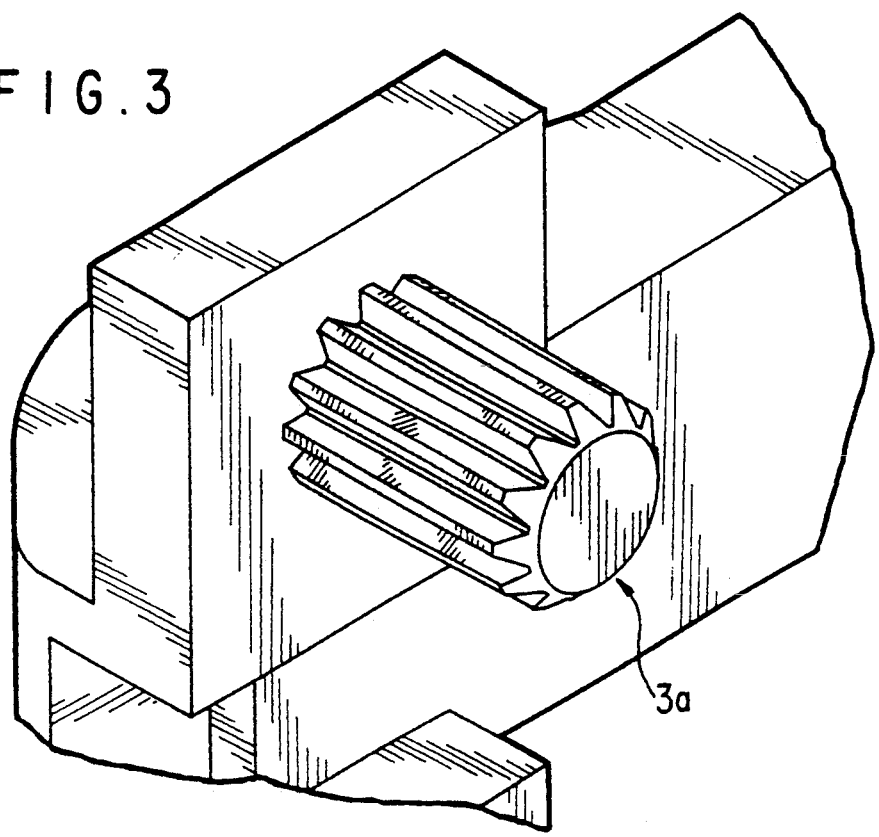
FIG. 3 shows an attachment mechanism for attaching the lightpipe or lightpipe array to a printed circuit board.
Figure 4:
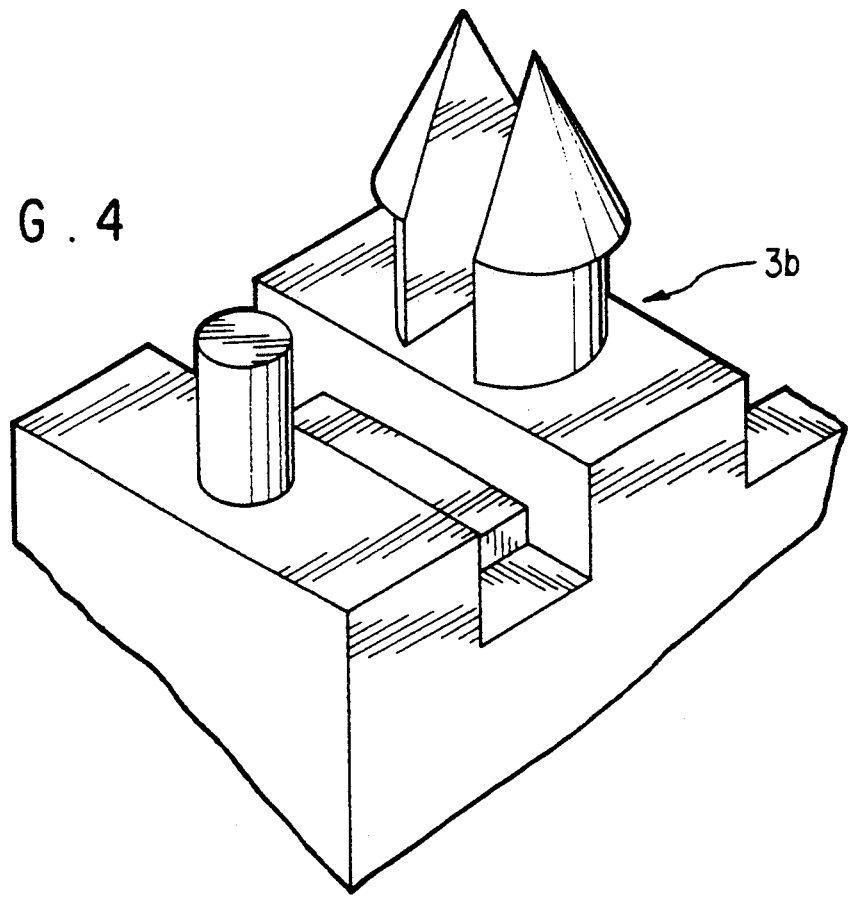
FIG. 4 shows an alternative attachment mechanism for attaching the lightpipe or lightpipe array to a printed circuit board.

Referring now to the drawings, wherein like reference numerals designate identical or corresponding parts throughout the several views, and more particularly to FIG. 1 thereof, a lightpipe 20 is illustrated. The lightpipe 20 is formed of a one piece light transmissive material such as a polycarbonate. The lightpipe 20 is secured to a printed circuit board or panel by way of an attachment device 3. The attachment device 3 can be, for example, a press fit pin 3a as illustrated in FIG. 3 or a snap-in post 3b as illustrated in FIG. 4.

In FIG. 1, the LED source is generally indicated by the reference numeral 1. The lightpipe 20 can be positioned adjacent to a standard RJ 45 connector schematically illustrated in FIG. 1 by reference numeral 13. SMD LEDs are initially reflowed to a printed circuit board in consideration of the recommended hole and LED layout in reference to the attachment device 3.

The lightpipe 20 comprises a first surface portion 2 at its lower end. After the lightpipe 20 is secured to the board, the LED or LEDs i (FIG. 2) will align under the surface portion 2. The lightpipe 20 further includes a first passageway 20a which comprises a plurality of first reflecting surfaces 4, 5, and 6, as well as a second passageway 20b which is substantially perpendicular to the first passageway and comprises a plurality of second reflecting surfaces 7, 8, and 9. The lightpipe 20 also comprises a radiating surface portion 10 through which light exits so as to provide for a visual indicator. The geometry of the radiating surface portion 10 can be modified based on the user's aesthetical preferences.

After the lightpipe is secured to the board so that the LED or LEDs (FIG. 2) are aligned with the surface portion 2, light from the LED I will enter the surface portion 2 and be internally reflected along the surface portions 4, 5, and 6 in a first direction and along the surface portions 7, 8, and 9 in a second direction which is different from the first direction. The redirected light will then pass through the radiating surface portion 10 and provide a visual indicator.

Figure 2:
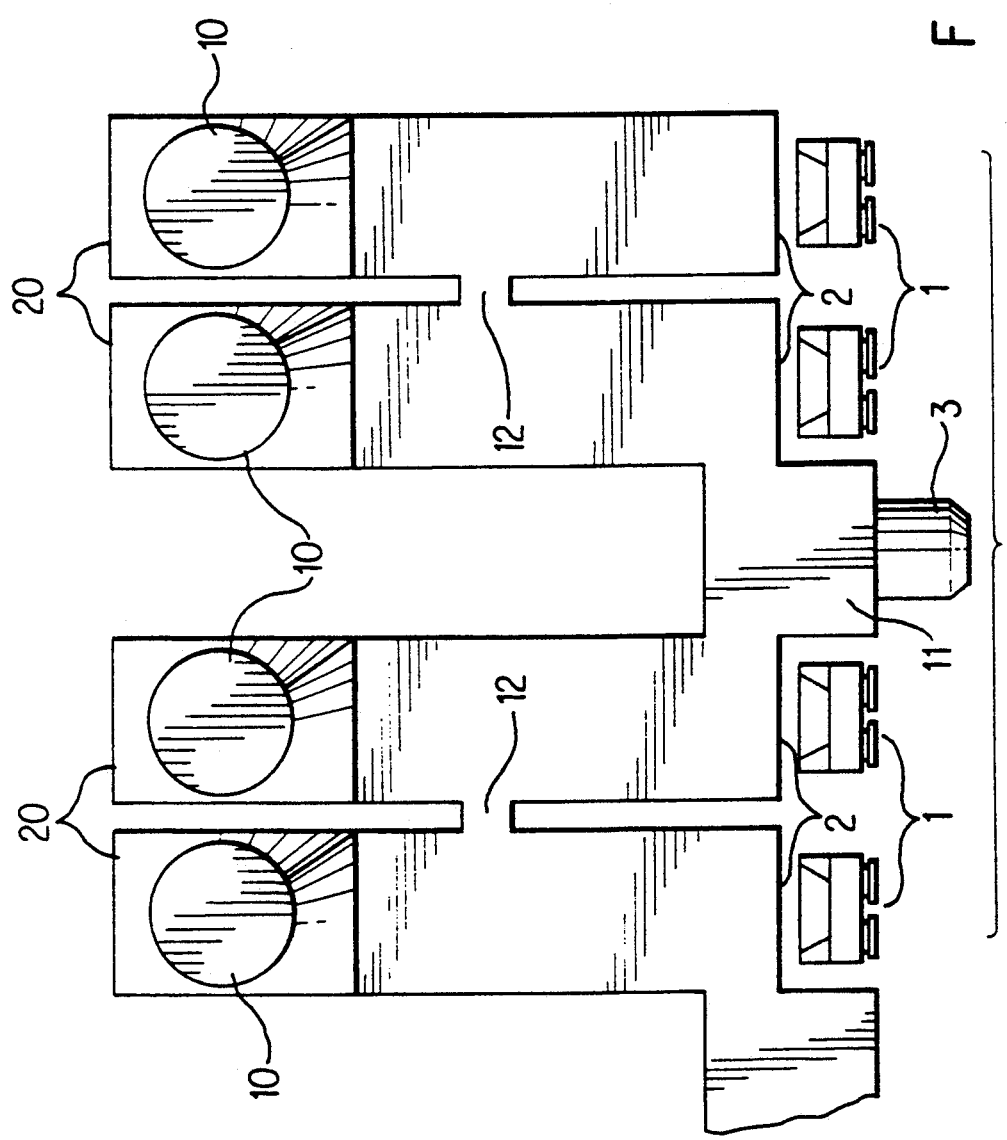
FIG. 2 illustrates a front view of a lightpipe array comprised of a plurality of lightpipes.

FIG. 2 shows a lightpipe array comprising a plurality of the lightpipes 20. As illustrated in FIG. 2, the lightpipe array is designed such that pairs of lightpipes are connected to each other by way of a connecting portion 12. A connecting portion 11 is utilized to connect the pairs of lightpipes to each other. The connecting portion 11 further includes the attachment device 3 for attaching the lightpipe array to the printed circuit board. FIG. 2 illustrates two pairs of the lightpipes connected to each other. As illustrated in FIG. 2, the number of lightpipes utilized in the side-by-side configuration shown in the figure depends on the design considerations which are required by the user. Thus, the lightpipe array as illustrated in FIG. 2 can be extended to include additional lightpipes in accordance with the user's preference so as to meet a plurality of design considerations. The positioning of the connecting portions 11 and 12 permit the arrays to be formed of a single piece of light transmissive material and also prevent significant cross talk, light bleed, or mixture of light from one lightpipe to an adjacent lightpipe.

Accordingly, the lightpipe array permits a single molded lightpipe to collect light from a plurality of LEDs and to redirect the light to different locations without a mixture of light between adjacent lightpipes.

Additionally, the optical path formed by the first and second passageways of the lightpipe can be varied to accommodate the required placement of the LEDs from the front panel of a circuit board.

Further, the lightpipe of the present invention permits a light output to remote areas which are not reachable by conventional lead lengths. Additionally, the configuration of the lightpipe of the present invention permits its utilization with a connector such as an RJ 45 connector without the requirement of positioning visual indicators at a position remote from the connector. Thus, the present invention permits the lightpipe to be positioned adjacent to and overhanging a connector 13 as illustrated in FIG. 1.

Also, if it becomes necessary to replace a faulty or damaged connector, the design of the present invention permits easy removal of the lightpipe with no desoldering of LEDs required.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letter patent of the United States is:

1. A lightpipe array for redirecting light from a plurality of surface mount LEDs, said lightpipe array comprising:
    (a) a first pair of adjacently positioned lightpipes connected to each other by a first connecting portion;
    (b) a second pair of adjacently positioned lightpipes connected to each other by a second connecting portion; and
    (c) a third connecting portion for connecting said first pair of adjacently positioned lightpipes to said second pair of adjacently positioned lightpipes, said third connecting portion comprising an attachment means for attaching said lightpipe array to a circuit board such that each of said lightpipes in said first pair of adjacently positioned lightpipes and each of said lightpipes in said second pair of adjacently positioned lightpipes are aligned with a respective LED on said circuit board.

2. The lightpipe array according to claim 1, wherein each of said lightpipes in said first and second pairs of lightpipes comprises:
    (a) a first surface portion which is aligned with a respective surface mounted LED when said lightpipe array is mounted on said circuit board, said first surface portion receiving light from said respective surface mounted LED;
    (b) a first passageway comprising a plurality of reflecting surfaces for redirecting said light received at said first surface portion from said respective surface mounted LED in a first direction;
    (c) a second passageway extending from said first passageway, said second passageway comprising a plurality of second reflecting surfaces for redirecting said light received from said first passageway in a second direction which is different from said first direction; and
    (d) a light radiating surface portion through which said light received from said second passageway exits so as to provide a visual indicator.

3. The lightpipe array according to claim 1, wherein:
    (a) said first connecting portion substantially prevents a mixture of light between said lightpipes of said first pair of adjacently positioned lightpipes;
    (b) said second connection portion substantially prevents a mixture of light between said lightpipes of said second pair of adjacently positioned lightpipes; and
    (c) light from each of said respective LEDs is separately directed through each of said lightpipes.

4. The lightpipe array according to claim 1, wherein said lightpipe array is formed of a one piece light transmissive material.

5. The lightpipe array according to claim 1, wherein said second passageway of each of said lightpipes is substantially perpendicular to said first passageway of each of said lightpipes.

6. The lightpipe array according to claim 1, wherein:

(a) said first passageway of each of said lightpipes redirects light in a substantially vertical direction; and (b) said second passageway of each of said lightpipes directs light in a substantially horizontal direction.

7. The lightpipe array according to claim 1, wherein said attachment means is a press-fit pin.

8. The lightpipe array according to claim 1, wherein said attachment means is a snap-in post.

* * * * *